United States Patent
Bruno et al.

(10) Patent No.: US 11,851,192 B2
(45) Date of Patent: Dec. 26, 2023

(54) AIRCRAFT ENVIRONMENTAL CONTROL SYSTEM

(71) Applicant: Hamilton Sundstrand Corporation, Charlotte, NC (US)

(72) Inventors: Louis J. Bruno, Ellington, CT (US); Tony Ho, Glastonbury, CT (US); Aiden Coutin, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/390,139

(22) Filed: Jul. 30, 2021

(65) Prior Publication Data

US 2022/0033092 A1 Feb. 3, 2022

Related U.S. Application Data

(60) Provisional application No. 63/058,831, filed on Jul. 30, 2020.

(51) Int. Cl.
*B64D 13/00* (2006.01)
*B64D 13/08* (2006.01)
(Continued)

(52) U.S. Cl.
CPC ............ *B64D 13/08* (2013.01); *B64D 13/02* (2013.01); *B64D 13/06* (2013.01); *F25B 9/004* (2013.01);
(Continued)

(58) Field of Classification Search
CPC ........ B64D 13/08; B64D 13/02; B64D 13/06; B64D 2013/0618; B64D 2013/064;
(Continued)

(56) References Cited

U.S. PATENT DOCUMENTS

| 2,777,301 A | 1/1957 | John |
| 4,374,469 A | 2/1983 | Rannenberg |

(Continued)

FOREIGN PATENT DOCUMENTS

| CN | 108357682 A | 8/2018 |
| EP | 1112930 A2 | 7/2001 |

(Continued)

OTHER PUBLICATIONS

European Extended Search Report; European Application No. 21188717.9; dated Jan. 4, 2022; 11 pages.
(Continued)

*Primary Examiner* — Phutthiwat Wongwian
*Assistant Examiner* — Sherman D Manley
(74) *Attorney, Agent, or Firm* — CANTOR COLBURN LLP (57) ABSTRACT

An environmental control system of an aircraft includes a plurality of inlets for receiving a plurality of mediums including a first medium and a second medium and an outlet for delivering a conditioned flow of the second medium to one or more loads of the aircraft. A ram air circuit includes a ram air shell having at least one heat exchanger positioned therein. A compressing device is arranged in fluid communication with the ram air circuit and the outlet. The compressing device including a first compressor, a second compressor, and at least one turbine operably coupled via a shaft. The first compressor and the second compressor are arranged in parallel with respect to a flow of the second medium and the first medium is used as a heat sink by another component within the environmental control system.

16 Claims, 4 Drawing Sheets

(51) Int. Cl.
  *B64D 13/02* (2006.01)
  *B64D 13/06* (2006.01)
  *F25B 9/00* (2006.01)
  *F25B 9/06* (2006.01)

(52) U.S. Cl.
  CPC .......... *F25B 9/06* (2013.01); *B64D 2013/064* (2013.01); *B64D 2013/0618* (2013.01); *B64D 2013/0662* (2013.01); *B64D 2013/0688* (2013.01)

(58) Field of Classification Search
  CPC .... B64D 2013/0662; B64D 2013/0688; B64D 2013/0648; F25B 9/06; F25B 9/004; Y02T 50/50
  See application file for complete search history.

(56) References Cited

U.S. PATENT DOCUMENTS

| | | | |
|---|---|---|---|
| 4,419,926 A * | 12/1983 | Cronin | B64D 13/06 454/74 |
| 5,299,763 A | 4/1994 | Bescoby et al. | |
| 5,442,905 A | 8/1995 | Claeys et al. | |
| 5,461,882 A * | 10/1995 | Zywiak | B64D 13/06 62/401 |
| 5,887,445 A | 3/1999 | Murry et al. | |
| 5,899,085 A * | 5/1999 | Williams | B64D 13/06 62/236 |
| 6,128,909 A | 10/2000 | Jonqueres | |
| 6,148,622 A | 11/2000 | Sanger | |
| 6,199,387 B1 | 3/2001 | Sauterleute | |
| 6,250,097 B1 | 6/2001 | Lui et al. | |
| 6,526,775 B1 | 3/2003 | Asfia et al. | |
| 6,684,660 B1 | 2/2004 | Bruno et al. | |
| 6,981,388 B2 | 1/2006 | Brutscher et al. | |
| 7,578,136 B2 * | 8/2009 | Derouineau | B64D 13/02 62/172 |
| 7,673,459 B2 | 3/2010 | Sheldon et al. | |
| 9,481,468 B1 | 11/2016 | Schiff | |
| 9,555,893 B2 | 1/2017 | Squier | |
| 9,669,936 B1 * | 6/2017 | Fiterman | B64D 13/06 |
| 10,137,993 B2 | 11/2018 | Bruno et al. | |
| 10,160,547 B2 * | 12/2018 | Bruno | B64D 13/06 |
| 10,202,197 B2 | 2/2019 | Bammann et al. | |
| 10,207,809 B2 * | 2/2019 | Koerner | B64D 13/06 |
| 10,232,948 B2 | 3/2019 | Bruno et al. | |
| 10,239,624 B2 * | 3/2019 | Behrens | B64D 13/06 |
| 10,457,399 B2 * | 10/2019 | Bammann | B64D 13/06 |
| 10,501,191 B1 * | 12/2019 | Dooley | B64D 13/06 |
| 10,526,092 B2 | 1/2020 | Defrancesco | |
| 10,549,860 B2 | 2/2020 | Bruno et al. | |
| 10,569,886 B2 | 2/2020 | Klimpel et al. | |
| 10,633,098 B2 | 4/2020 | Shea | |
| 2004/0172963 A1 | 9/2004 | Axe et al. | |
| 2015/0166187 A1 | 6/2015 | Durbin et al. | |
| 2015/0329210 A1 * | 11/2015 | Bammann | B60H 1/00435 62/61 |
| 2016/0083100 A1 * | 3/2016 | Bammann | B64D 13/06 62/89 |
| 2016/0347456 A1 * | 12/2016 | Bruno | F02C 6/08 |
| 2017/0341758 A1 * | 11/2017 | Bruno | F04D 25/045 |
| 2017/0341761 A1 * | 11/2017 | Bruno | B64D 13/08 |
| 2017/0341768 A1 | 11/2017 | Bruno et al. | |
| 2017/0342838 A1 | 11/2017 | Bruno et al. | |
| 2018/0057172 A1 * | 3/2018 | Sautron | F02C 3/04 |
| 2018/0215473 A1 | 8/2018 | Army et al. | |
| 2018/0237143 A1 | 8/2018 | Bombled et al. | |
| 2018/0297709 A1 * | 10/2018 | Bruno | B64D 13/02 |
| 2019/0002108 A1 | 1/2019 | Bruno | |
| 2019/0112052 A1 * | 4/2019 | Bruno | F01D 15/08 |
| 2019/0135440 A1 | 5/2019 | Bruno et al. | |
| 2019/0225343 A1 | 7/2019 | Bruno et al. | |
| 2019/0291875 A1 * | 9/2019 | Behrens | F02C 7/32 |
| 2019/0389587 A1 | 12/2019 | Bruno et al. | |
| 2020/0182550 A1 | 6/2020 | Army et al. | |
| 2021/0001992 A1 | 1/2021 | Ho et al. | |
| 2022/0033084 A1 | 2/2022 | Bruno et al. | |
| 2022/0033085 A1 | 2/2022 | Bruno et al. | |
| 2022/0033086 A1 | 2/2022 | Bruno et al. | |
| 2022/0033087 A1 | 2/2022 | Bruno et al. | |
| 2022/0033089 A1 | 2/2022 | Bruno et al. | |
| 2022/0033090 A1 | 2/2022 | Bruno et al. | |
| 2022/0033091 A1 | 2/2022 | Bruno et al. | |
| 2022/0033093 A1 | 2/2022 | Bruno et al. | |

FOREIGN PATENT DOCUMENTS

| | | | |
|---|---|---|---|
| EP | 2862803 A1 | 4/2015 | |
| EP | 2937287 A1 | 10/2015 | |
| EP | 2939927 A1 | 11/2015 | |
| EP | 3248879 A1 | 11/2017 | |
| EP | 3249198 A1 | 11/2017 | |
| EP | 3354573 A1 | 8/2018 | |
| EP | 3354576 A1 | 8/2018 | |
| EP | 3363740 A1 | 8/2018 | |
| EP | 3489142 A1 | 11/2018 | |
| EP | 3098165 B1 | 1/2019 | |
| EP | 3470337 A1 | 4/2019 | |
| EP | 3480113 A1 | 5/2019 | |
| EP | 3514065 A1 | 7/2019 | |
| EP | 3543131 A1 | 9/2019 | |
| EP | 3587269 A1 | 1/2020 | |
| EP | 3760542 A1 | 6/2021 | |
| EP | 3835209 A1 | 6/2021 | |
| GB | 2398864 A | 9/2004 | |
| JP | 2001328596 A | 11/2001 | |
| JP | 2005067356 A | 3/2005 | |
| JP | 2006078092 A | 3/2006 | |

OTHER PUBLICATIONS

European Extended Search Report; European Application No. 21188736.9; dated Jan. 4, 2022; 11 pages.
European Extended Search Report; European Application No. 21188746.8; dated Jan. 4, 2022; 11 pages.
European Extended Search Report; European Application No. 21188755.9; dated Jan. 4, 2022; 10 pages.
European Extended Search Report; European Application No. 21188762.5; dated Jan. 4, 2022; 12 pages.
European Extended Search Report; European Application No. 21188779.9; dated Jan. 4, 2022; 8 pages.
European Extended Search Report; European Application No. 21188819.3; dated Jan. 4, 2022; 9 pages.
European Extended Search Report; European Application No. 21188914.2; dated Jan. 4, 2022; 9 pages.
European Extended Search Report; European Application No. 21188926.6; dated Jan. 5, 2022; 8 pages.
U.S. Non-Final Office Action dated Jan. 5, 2023 for U.S. Appl. No. 17/390,116, filed Jul. 30, 2021; Report dated Jan. 5, 2023 (pp. 1-22).
U.S. Non-Final Office Action dated Nov. 17, 2022 for U.S. Appl. No. 17/390,095, filed Jul. 30, 2021; Report dated Nov. 17, 2022 (pp. 1-25).
U.S. Non-Final Office Action dated Dec. 22, 2022 for U.S. Appl. No. 17/390,167, filed Jul. 30, 2021; Report dated Dec. 22, 2022 (pp. 1-25).
European Office Action for European Application No. 21188717.9; dated May 24, 2023 6 Pages.
European Office Action for European Application No. 21188736.9; dated May 23, 2023; 6 Pages.
European Office Action for European Application No. 21188746.8; dated May 24, 2023; 6 pages.
European Office Action for European Application No. 21188755.9; dated May 30, 2023; 5 pages.
European Office Action for European Application No. 21188762.5; dated May 30, 2023; 5 pages.
U.S. Non-Final Office Action dated Mar. 1, 2023 for U.S. Appl. No. 17/390,077, filed Jul. 30, 2021; (pp. 1-9).
U.S. Non-Final Office Action dated Mar. 17, 2023 for U.S. Appl. No. 17/390,188, filed Jul. 30, 2021; (pp. 1-17).

(56) References Cited

OTHER PUBLICATIONS

U.S. Non-Final Office Action dated Jun. 5, 2023 for U.S. Appl. No. 17/390,200, filed Jul. 30, 2021; (pp. 1-7).
U.S. Non-Final Office Action dated Aug. 1, 2023 for U.S. Appl. No. 17/390,042, filed Jul. 30, 2021; (pp. 1-7).
European Office Action for European Application No. 21188914.2; dated Aug. 18, 2023 (pp. 1-5).
European Office Action for European Application No. 21188779.9; dated Aug. 17, 2023 (pp. 1-4).
U.S. Final Office Action Dated for U.S. Appl. No. 17/390,188, filed Jul. 30, 2021; dated Aug. 18, 2023 (pp. 1-18).

* cited by examiner

FIG. 4

AIRCRAFT ENVIRONMENTAL CONTROL SYSTEM

CROSS-REFERENCE TO RELATED APPLICATIONS

This application claims the benefit of U.S. Provisional Application No. 63/058,831 filed Jul. 30, 2020, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches provides a reduction in airplane fuel burn.

BRIEF DESCRIPTION

According to an embodiment, an environmental control system of an aircraft includes a plurality of inlets for receiving a plurality of mediums including a first medium, a second medium, and a third medium and an outlet for delivering a conditioned flow of the second medium to one or more loads of the aircraft. A ram air circuit includes a ram air shell having at least one heat exchanger positioned therein. At least one compressing device is arranged in fluid communication with the ram air circuit and the outlet. The at least one compressing device includes a compressor and at least one turbine operably coupled via a shaft. A heat exchanger is arranged in fluid communication with the at least one compressing device. The second medium output from the at least one compressing device is cooled by the third medium. The second medium is fresh air.

In addition to one or more of the features described above, or as an alternative, in further embodiments the third medium is cabin discharge air.

In addition to one or more of the features described above, or as an alternative, in further embodiments the at least one compressing device includes a first compressing device and a second compressing device, an outlet of the first compressing device being arranged in fluid communication with an inlet of the second compressing device.

In addition to one or more of the features described above, or as an alternative, in further embodiments the second compressing device is fluidly connected to the outlet.

In addition to one or more of the features described above, or as an alternative, in further embodiments the heat exchanger is arranged between the outlet of the first compressing device and the inlet of the second compressing device.

In addition to one or more of the features described above, or as an alternative, in further embodiments the first compressing device includes a first compressor and the second compressing device includes a second compressor, the heat exchanger being arranged between the first compressor and the second compressor relative to a flow of the second medium.

According to an embodiment, an environmental control system of an aircraft includes a plurality of inlets for receiving a plurality of mediums including a first medium, a second medium, and a third medium and an outlet for delivering a conditioned flow of the second medium to one or more loads of the aircraft. At least one compressing device is arranged in fluid communication with the plurality of inlets and the outlet. The at least one compressing device includes a four-wheel compressing device having a compressor and at least one turbine operably coupled via a shaft. In a first mode of operation, the compressor is driven by the first medium, and in a second mode of operation, the compressor is driven by the third medium.

In addition to one or more of the features described above, or as an alternative, in further embodiments the first mode of operation is a low altitude mode.

In addition to one or more of the features described above, or as an alternative, in further embodiments the second mode of operation is a high altitude mode.

In addition to one or more of the features described above, or as an alternative, in further embodiments the at least one compressing device includes a first compressing device and a second compressing device arranged in series relative to a flow of the second medium, wherein the second compressing device is the four-wheel compressing device and is fluidly connected to the outlet.

In addition to one or more of the features described above, or as an alternative, in further embodiments the first compressing device includes another turbine and another compressor, the another compressor being arranged in series with upstream from the compressor of the second compressing device.

In addition to one or more of the features described above, or as an alternative, in further embodiments comprising a heat exchanger arranged between the another compressor and the compressor, wherein the second medium is cooled within the heat exchanger by the third medium.

In addition to one or more of the features described above, or as an alternative, in further embodiments the second medium is fresh air and the third medium is cabin discharge air.

In addition to one or more of the features described above, or as an alternative, in further embodiments the another turbine is configured to extract work from the first medium.

In addition to one or more of the features described above, or as an alternative, in further embodiments comprising: a ram air circuit including a ram air shell having at least one heat exchanger positioned therein; and a dehumidification system arranged in fluid communication with the ram air circuit.

In addition to one or more of the features described above, or as an alternative, in further embodiments the first medium output from the another turbine is used as a heat sink within the dehumidification system.

In addition to one or more of the features described above, or as an alternative, in further embodiments a portion of the dehumidification system is arranged within the ram air shell.

According to an embodiment, an environmental control system of an aircraft includes a plurality of inlets for receiving a plurality of mediums including a first medium and a second medium and an outlet for delivering a conditioned flow of the second medium to one or more loads of the aircraft. A ram air circuit includes a ram air shell having at least one heat exchanger positioned therein. A compressing device is arranged in fluid communication with the ram air circuit and the outlet. The compressing device including a first compressor, a second compressor, and at least one turbine operably coupled via a shaft. The first compressor and the second compressor are arranged in parallel with respect to a flow of the second medium and the first medium is used as a heat sink by another component within the environmental control system.

In addition to one or more of the features described above, or as an alternative, in further embodiments comprising a dehumidification system arranged in fluid communication with the ram air circuit, wherein the first medium output from the at least one turbine is used as a heat sink within the dehumidification system.

In addition to one or more of the features described above, or as an alternative, in further embodiments a portion of the dehumidification system is arranged within the ram air shell.

In addition to one or more of the features described above, or as an alternative, in further embodiments comprising another compressing device arranged in fluid communication with and downstream from the compressing device.

In addition to one or more of the features described above, or as an alternative, in further embodiments the another compressing device includes another compressor, and an outlet of the first compressor and an outlet of the second compressor are fluidly connected to an inlet of the another compressor.

In addition to one or more of the features described above, or as an alternative, in further embodiments comprising a heat exchanger arranged between the outlet of the first compressor, the outlet of the second compressor and the inlet of the another compressor and the compressor, wherein the second medium is cooled within the heat exchanger.

In addition to one or more of the features described above, or as an alternative, in further embodiments the plurality of mediums further includes a third medium, the second medium being cooled by the third medium within the heat exchanger.

In addition to one or more of the features described above, or as an alternative, in further embodiments the second medium is fresh air and the third medium is cabin discharge air.

In addition to one or more of the features described above, or as an alternative, in further embodiments comprising a dehumidification system arranged in fluid communication with the ram air circuit.

In addition to one or more of the features described above, or as an alternative, in further embodiments a portion of the dehumidification system is arranged within the ram air circuit.

In addition to one or more of the features described above, or as an alternative, in further embodiments comprising a divider arranged within the ram air shell to separate the ram air shell into a first region and a second region, the at least one ram air heat exchanger being arranged within the first region and the portion of the dehumidification system being arranged within the second region.

In addition to one or more of the features described above, or as an alternative, in further embodiments the at least one ram air heat exchanger is a separate component from the portion of the dehumidification system arranged within the second region.

In addition to one or more of the features described above, or as an alternative, in further embodiments the at least one ram air heat exchanger and the portion of the dehumidification system arranged within the second region are integrally formed.

In addition to one or more of the features described above, or as an alternative, in further embodiments the portion of the dehumidification system within the ram air circuit is the another component.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments herein provide an environmental control system of an aircraft that mixes mediums from different sources to power the environmental control system and to provide cabin pressurization and cooling at a high fuel burn efficiency. The medium can generally be air, while other examples include gases, liquids, fluidized solids, or slurries.

Figure 1:
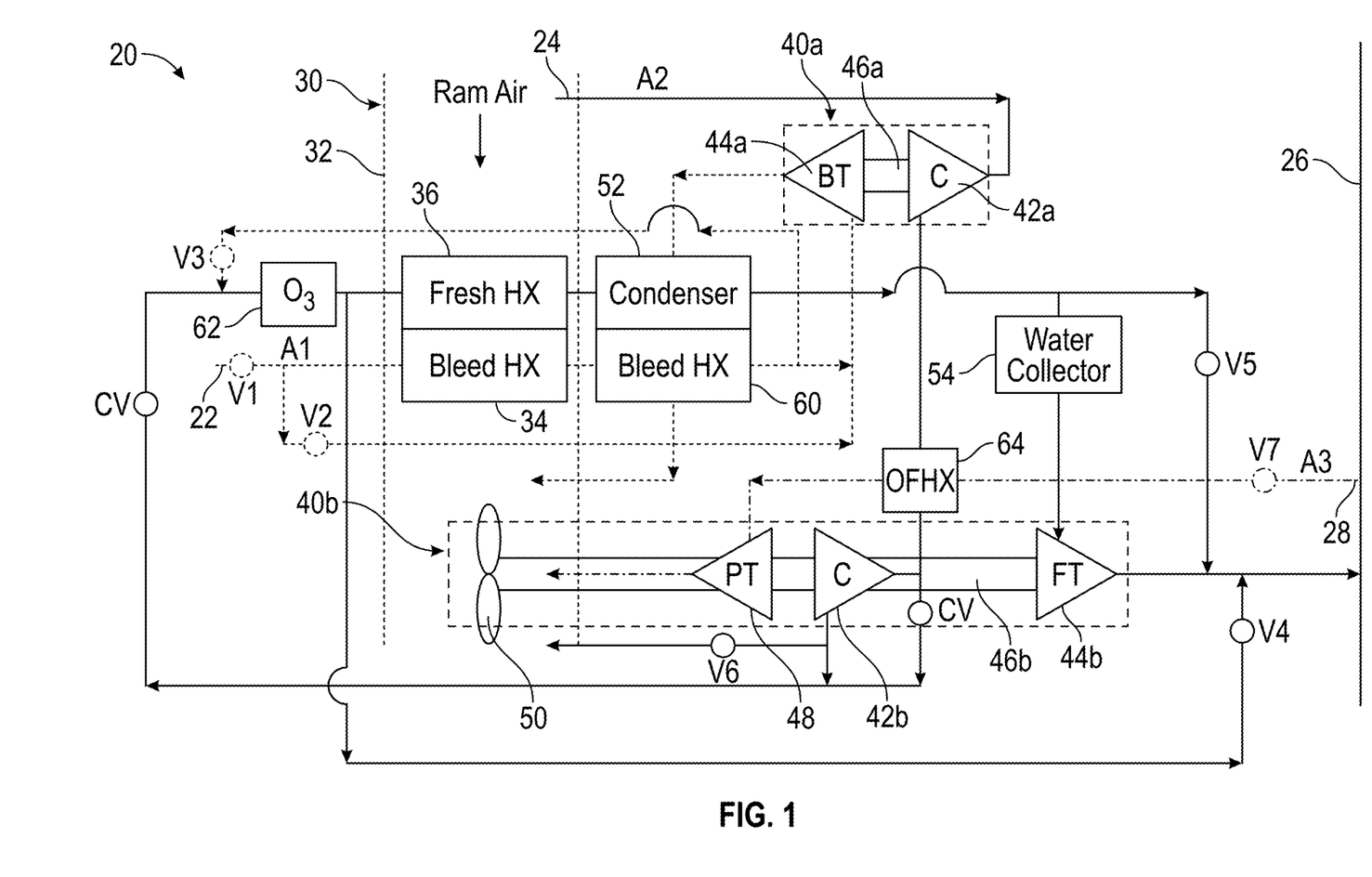
FIG. 1 is a simplified schematic of a system according to an embodiment.

With reference now to FIG. 1, a schematic diagram of a portion of an environment control system (ECS) 20, such as an air conditioning unit or pack for example, is depicted according to non-limiting embodiments. Although the environmental control system 20 is described with reference to an aircraft, alternative applications are also within the scope of the disclosure. As shown in the FIGS., the system 20 can receive a first medium A1 at a first inlet 22. In embodiments where the environmental control system 20 is used in an aircraft application, the first medium A1 may be bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 is also configured to receive a second medium A2 at an inlet 24 and may provide a conditioned form of at least one of the first medium A1 and the second medium A2 to a volume 26. In an embodiment, the second medium A2 is fresh air, such as outside air for example. The outside air can be procured via one or more scooping mechanisms, such as an impact scoop or a flush scoop for example. Thus, the inlet 24 can be considered a fresh or outside air inlet. In an embodiment, the second medium A2 is ram air drawn from a portion of a ram air circuit to be described in more detail below. Generally, the second medium A2 described herein is at an ambient pressure equal to an air pressure outside of the aircraft when the aircraft is on the ground and is between an ambient pressure and a cabin pressure when the aircraft is in flight.

The system 20 can further receive a third medium A3 at an inlet 28. In one embodiment, the inlet 28 is operably coupled to a volume 26, such as the cabin of an aircraft, and the third medium A3 is cabin discharge air, which is air leaving the volume 26 and that would typically be discharged overboard. In some embodiments, the system 20 is configured to extract work from the third medium A3. In this manner, the pressurized air A3 of the volume 26 can be utilized by the system 20 to achieve certain operations.

The environmental control system 20 includes a RAM air circuit 30 having a shell or duct, illustrated schematically in broken lines at 32, within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first or primary heat exchanger 34 and a second or secondary heat exchanger 36. Although two heat exchangers are illustrated, it should be understood that embodiments including a single heat exchanger, or alternatively, embodiments including more than two heat exchangers are also contemplated herein. Within the heat exchangers 34, 36, ram air, such as outside air for example, acts as a heat sink to cool a medium passing there through, for example the first medium A1 and/or the second medium A2.

The system 20 additionally comprises at least one compressing device. In the illustrated, non-limiting embodiments, the system 20 includes a first compressing device 40a and a second compressing device 40b. However, embodiments including only a single compressing device, or alternatively, embodiments including more than two compressing devices are also within the scope of the disclosure. Further, as shown, at least a portion of the first compressing device 40a and the second compressing device 40b may be arranged in series relative to a flow of one or more of the mediums, such as the second medium A2 for example, through the system 20. The first and second compressing devices 40a, 40b may, but need not have different configurations and components.

In the illustrated, non-limiting embodiment, the compressing devices 40a, 40b of the system 20 are mechanical devices that include components for performing thermodynamic work on a medium (e.g., extracts work from or applies work to the first medium A1, the second medium A2, and/or the third medium A3 by raising and/or lowering pressure and by raising and/or lowering temperature). Examples of each compressing device 40 include an air cycle machine, a two-wheel air cycle machine, a three-wheel air cycle machine, a four-wheel air cycle machine, etc.

Figure 2:
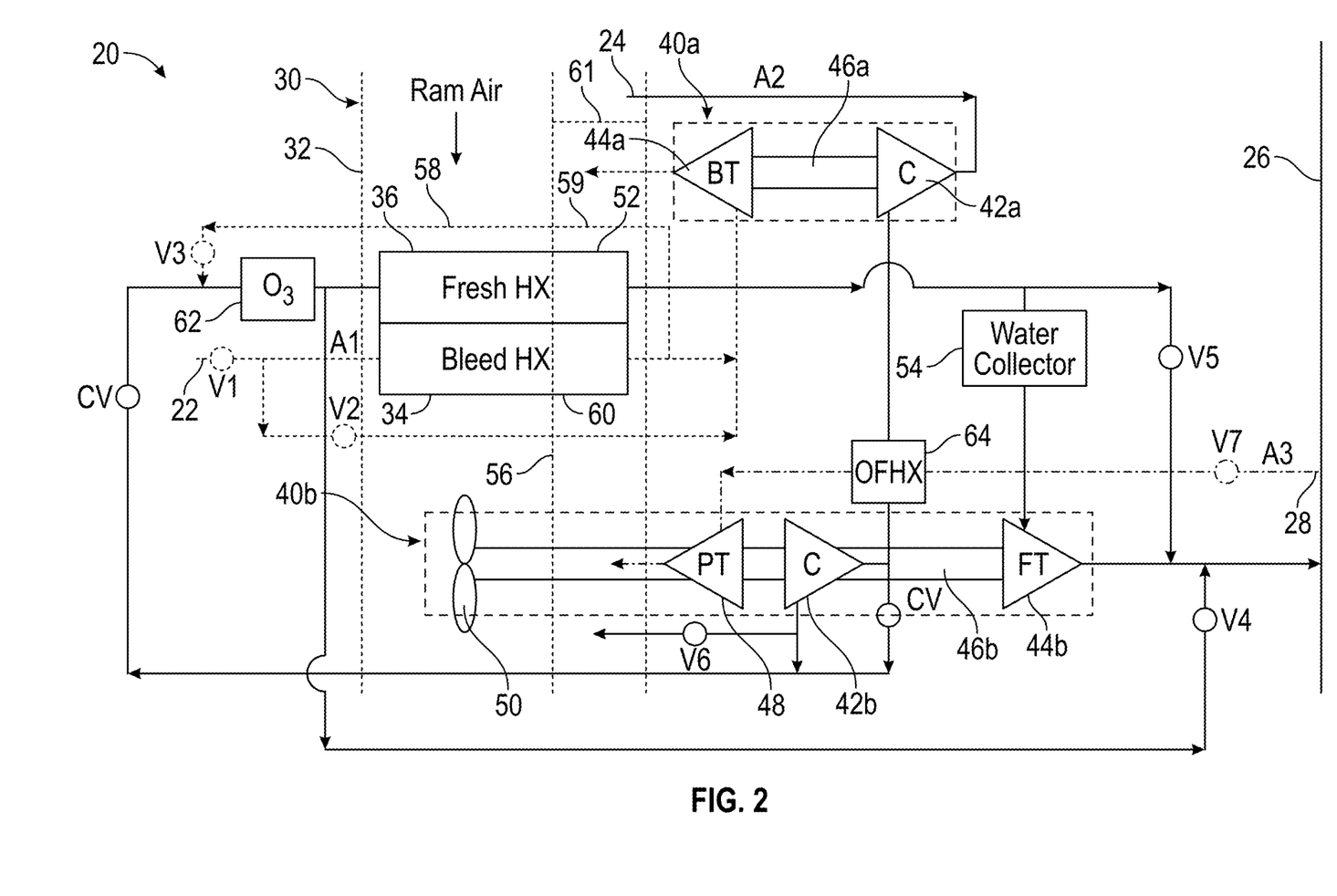
FIG. 2 is a simplified schematic of a system according to another embodiment.

In the non-limiting embodiment of FIGS. 1 and 2, the first compressing device 40a is a two-wheel air cycle machine or turbo machine including a compressor 42a and a turbine 44a operably coupled to each other via a shaft 46a. The compressor 42a is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42a is configured to receive and pressurize the second medium A2. The turbine 44a is a mechanical device that expands a medium and extracts work therefrom (also referred to as extracting energy) to drive the compressor 42a via the shaft 46a.

In an embodiment, the second compressing device 40b is a four-wheel air cycle machine including a compressor 42b, a turbine 44b, power turbine 48, and a fan 50 operably coupled to each other via a shaft 46b. The first turbine 44b and the power turbine 48 are operable, independently or in combination, to drive the compressor 42b and the fan 50 via the shaft 46b. The fan 50 is a mechanical device that can force via push or pull methods a medium (e.g., ram air) through the shell 32 across the one or more ram heat exchangers 34, 36 and at a variable cooling flow rate to control temperatures. Although the fan 50 is illustrated as being part of the four-wheel air cycle machine that forms the second compressing device 40b, in other embodiments, the fan 50 may be separate from the compressing device 40b and driven by another suitable means. In such instances, the fan 50 may be electrically driven, may be a tip turbine fan, or may be part of a simply cycle machine.

The system 20 additionally includes a dehumidification system. In the illustrated, non-limiting embodiment of FIG. 1, the dehumidification system includes a condenser 52 and a water extractor or collector 54 arranged downstream from the condenser 52. The condenser 52 and the water collector 54 are arranged in fluid communication with the second medium A2. The condenser 52 is a particular type of heat exchanger and the water collector 54 is a mechanical device that performs a process of removing water from a medium. In the non-limiting embodiment of FIG. 1, the condenser 52 of the dehumidification system is illustrated as a separate heat exchanger located downstream from and arranged in fluid communication with an outlet of the second heat exchanger 36. However, the configuration of the at least one dehumidification system may vary.

Figure 3:
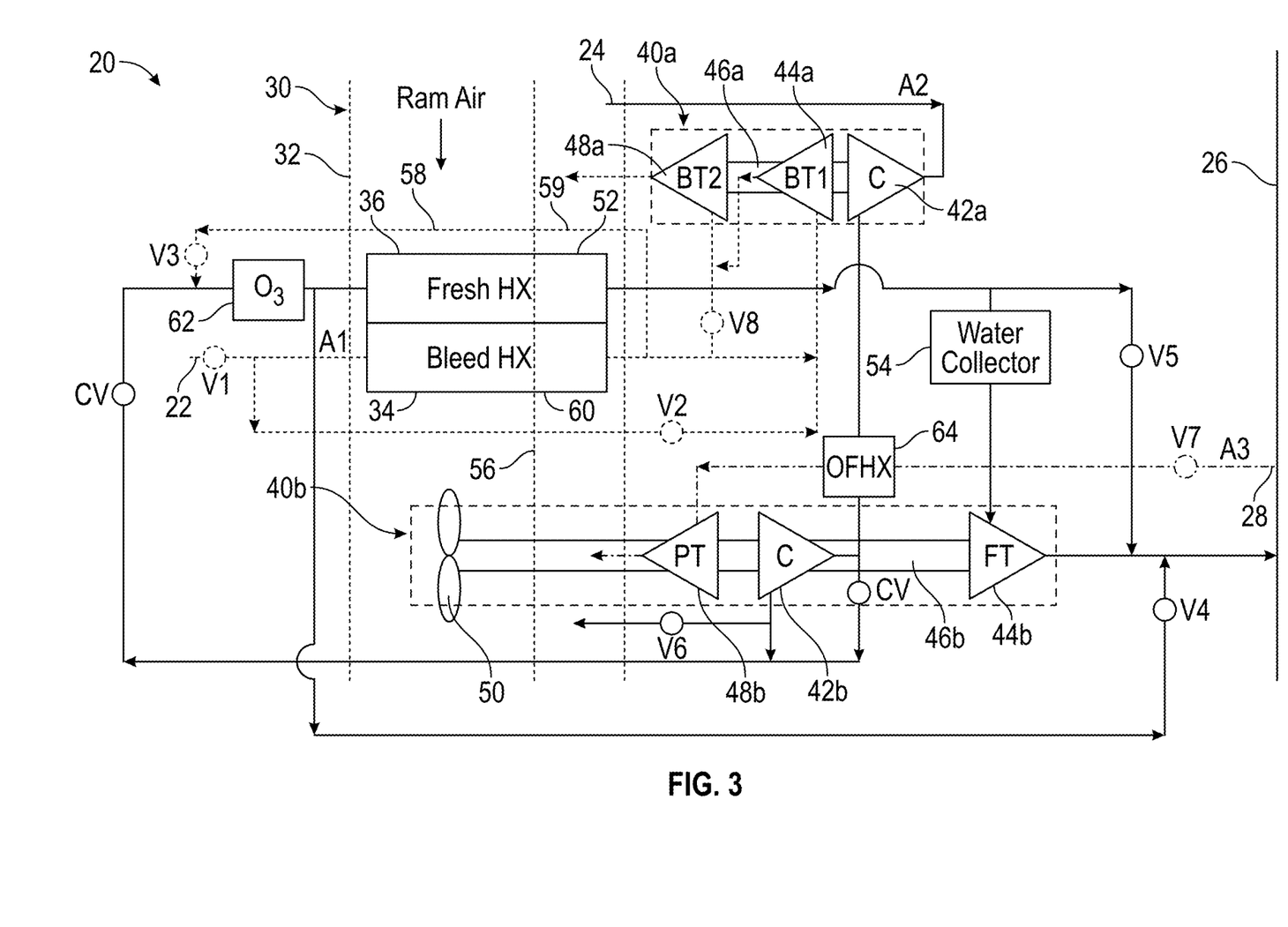
FIG. 3 is a simplified schematic of a system according to another embodiment.
Figure 4:
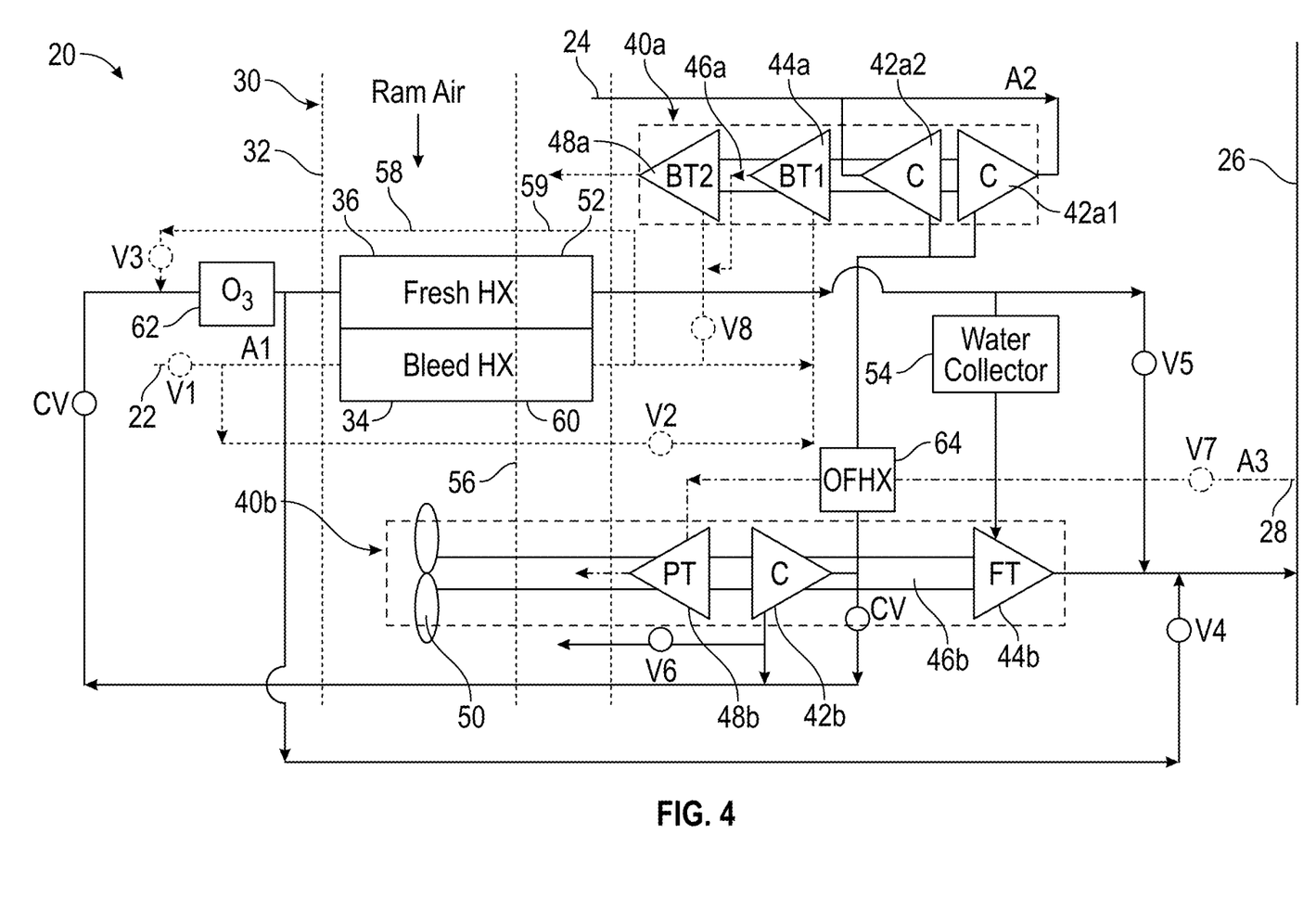
FIG. 4 is a simplified schematic of a system according to another embodiment.

For example, in the non-limiting embodiments of FIGS. 2-4, the condenser 52 is formed integrally with the secondary heat exchanger 36. For example, the second medium A2 is configured to flow through a first portion of the heat exchanger that forms the secondary heat exchanger 36, and then through a second, downstream portion of the heat exchange, which forms the condenser 52. In such embodiments, although the entire heat exchanger is arranged within the ram air shell 32, a divider 56 wall may extend parallel to the flow of ram air through the shell 32 at the interface between the first and second portions of the heat exchanger to separate the ram air shell 32 into a distinct first region 58 and second region 59. Accordingly, the fan 50 of the second compressing device 40b is operable to draw ram air through the first region 58, across the primary heat exchanger 34 and the first portion that forms a secondary heat exchanger 36. A fluid flow, distinct from the ram air flow to be described in more detail below, is configured to flow through the second region 59, across the second portion of the heat exchanger that forms the condenser 52. However, it should be understood that embodiments where the secondary heat exchanger 36 is arranged within the first region 58, and a condenser 52, separate from and arranged in fluid communication with an outlet of the secondary heat exchanger 36, is arranged within the second region 59 are also within the scope of the disclosure.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 may be configured to control a supply of the first medium A1 to the system 20, and a second valve may be operable to allow a portion of a medium, such as the first medium A1, to bypass the ram air circuit 30. As a result, operation of the second valve V2 may be used to add heat to the system 20 and to drive the compressing device 40a when needed. A third valve V3 may be operable in the event of a pack failure, such as where the system 20 does not have a sufficient flow of the second medium A2 to meet the demands of the cabin or other loads. In such instances, operation of valve V3 may be used to supplement the flow of second medium A2 with first medium A1, such as at a location upstream from the dehumidification system for example, to meet the demands of the aircraft.

Operation of a fourth valve V4 may be used to allow a portion of the second medium A2 to bypass the dehumidification system and the turbine 44b of the second compressing device 40b and operation of a fifth valve V5 may be configured to allow a portion of the second medium A2 to bypass the turbine 44b of the second compressing device 40b. In an embodiment, a sixth valve V6 is a surge control valve, operable to exhaust a portion of the second medium A2 output from the compressor 42b of the second compressing device 40b overboard or into the ram air circuit 30 to prevent a compressor surge. A seventh valve V7 may be configured to control a supply of a third medium A3 provided to the power turbine 48 of the second compressing device 40b.

With continued reference to FIGS. 1 and 2, the system 20 is operable in a plurality of modes, selectable based on a flight condition of the aircraft. For example, the system 20 may be operable in a first, low altitude mode or a second, high altitude mode. The first, low altitude mode is typically used for ground and low altitude flight conditions, such as ground idle, taxi, take-off, and hold conditions, and the second, high altitude mode may be used at high altitude cruise, climb, and descent flight conditions. During normal operation in both the low altitude mode and the high-altitude mode, only the second medium is provided to one or more loads of the aircraft, including the cabin 26.

In the first, low altitude mode, valve V1 is open, and a high pressure first medium A1, such as bleed air drawn from an engine or APU, is provided to the primary heat exchanger 34. Within the first heat exchanger 34, the first medium A1 is cooled via a flow of ram air, driven by the fan 50. As shown in FIG. 1, the cool first medium A1 passes sequentially from the first heat exchanger 34 to another heat exchanger 60, where the first medium A1 is further cooled by another medium, distinct from the ram air. In other embodiments, best shown in FIG. 2, the heat exchanger 60 may be integrally formed with the primary heat exchanger 34 and is positioned within the second region 59 of the ram air circuit 30.

From the heat exchanger 60, the further cooled first medium A1 is provided to the inlet of the turbine 44a of the first compressing device 40a. The high pressure first medium A1 is expanded across the turbine 44a and work is extracted therefrom. The first medium A1 output from the turbine 44a has a reduced temperature and pressure relative to the first medium A1 provided to the inlet of the turbine 44a. The first medium A1 at the outlet of the turbine 44a may be used to cool the second medium A2 within the condenser 52, to be described in more detail below, and/or to cool the first medium within the heat exchanger 60. This cooling may occur separately from (FIG. 1) or within the second region 59 of the ram air circuit 30 (FIG. 2). After receiving heat within heat exchanger 60, the first medium A1 may be exhausted overboard or outside the aircraft or may be dumped into a portion of the ram air circuit 30, for example downstream from the heat exchangers therein. In an embodiment, best shown in FIG. 2, a wall or barrier 61 may be arranged at an upstream end of the second region 59 to prevent another medium, separate from the medium output from the first compressing device 40a from passing through the second region 59. Although such a barrier 61 is illustrated in FIG. 2, it should be understood that any of the embodiments of the ram air system including a separate first and second region 58, 59 may include such a barrier 61.

The work extracted form the first medium A1 in the turbine 44a drives the compressor 42a, which is used to compress a second medium A2 provided from an aircraft inlet 24. As shown, the second medium A2, such as fresh air for example, is drawn from an upstream end of the ram air circuit 30 or from another source and provided to an inlet of the compressor 42a. The act of compressing the second medium A2 heats the second medium A2 and increases the pressure of the second medium A2. In an embodiment, a configuration of the compressor 42a is selected to increase the pressure of the second medium A2 to less than double its starting pressure.

The second medium A2 output from the compressor 42a of the first compressing device 40a is provided to the compressor 42b of the second compressing device 40b. Within the compressor 42b, the second medium A2 is further heated and pressurized. Accordingly, the second medium A2 is configured to flow through the compressor 42a of the first compressing device 40a and the compressor 42b of the second compressing device 40b in series.

In some embodiments, the compressed second medium A2 output from the compressor 42b is provided to an ozone removal heat exchanger 62, before being provided to the secondary heat exchanger 36 where it is cooled by ram air. The second medium A2 exiting the secondary heat exchanger 36 is then provided to the condenser 52, where the second medium A2 is further cooled by the first medium A1 output from the turbine 44a of the first compressing device 40a. From the condenser 52, the second medium A2 is provided to the water collector 54 where any free moisture is removed, to produce cool medium pressure air. This cool pressurized second medium A2 then enters the turbine 44a where work is extracted from the second medium A2 and used to drive the compressor 42b and the fan 50. The second medium A2 output from the turbine 44b is then sent to one or more loads of the aircraft, such as to condition the volume or cabin 26.

The high-altitude mode of operation is similar to the low altitude mode of operation. However, in some embodiments, valve V2 may be open to allow at least a portion of the first medium A1 to bypass the primary heat exchanger 34 and heat exchanger 60. Valve V2 may be operated to control, and in some embodiments, maximize the temperature of the first medium A1 provided to the turbine 44a of the first compressing device. In an embodiment, the pressure ratio across the turbine is less than a conventional turbine. As a result, the work extracted from the first medium A1 within the turbine 44a may be optimized while exhausting the first medium A1 therefrom with a temperature suitable to function as a heat sink with respect to the condenser 52 and/or heat exchanger 60.

In the high-altitude mode of operation, the compressor 42a of the first compressing device 40a may be operate to increases the pressure of the second medium A2 up to four times its initial pressure. In addition, the second medium A2 is cooled between the compressor 42a of the first compressing device 40a and the compressor 42b of the second compressing device 40b. Accordingly, the system 20 may additionally include at least one outflow heat exchanger 64, such as arranged directly downstream from the outlet of the compressor 42a. The third medium A3, such as exhaust of cabin air for example, is recirculated to the system 20 from the pressurized volume or cabin 26, through a valve V7. Within the outflow heat exchanger 64, heat is transferred to the third medium A3 via a heat exchange relationship with the second medium A2, before both mediums are provided to a component of the second compressing device 40b.

In the illustrated, non-limiting embodiment, the third medium A3 output from outflow heat exchanger 64 is provided to the power turbine 48 of the second compressing device 40b. Within the power turbine 48, the work extracted from the third medium A3 is used to drive the fan 50, and therefore move a flow of ram air through the ram air circuit 30, via rotation of the shaft 46b. In an embodiment, the pressure ratio across the power turbine 48 is at least 3:1. The third medium A3 output from the power turbine 48 may be dumped into the ram air circuit 30, downstream from all heat exchangers, or alternatively, may be dumped overboard.

The second medium A2 output from the outflow heat exchanger 64 is provided to the compressor 42b of the second compressing device 40b and from there may follow the same flow path with respect to the secondary heat exchanger 36 and condenser 52 as previously described for the low altitude mode of operation. In an embodiment, valve V5 is open in the high-altitude mode. As a result, at least a portion of the second medium A2 output from the condenser 52 bypasses the turbine 44b of the second compressing device 40b.

Depending on the temperature and humidity conditions of the day, the second medium output from the condenser 52 may be too cold to provide directly to the cabin 26, via valve V5. In such instances, during the high altitude mode of operation, valve V4 is opened, thereby allowing a portion of the heated second medium A2 output from the compressor 42b of the second compressing device 40b to mix with the cold second medium A2 upstream from an outlet of the system 20. Accordingly, valve V4 can be controlled to achieve a second medium A2 having a desired temperature for conditioning the cabin 26.

With reference now to FIG. 3, another configuration of the system 20 is illustrated. The system 20 is similar to the configuration of FIG. 2; however, in the illustrated, non-limiting embodiment, the first compressing device 40a includes not only a compressor 42a and first turbine 44a, but also a second turbine 48a. Further, the flow of the first medium A1 output from the heat exchanger 60, may be configured to flow through the first turbine 44a and the second turbine 48a in series. By providing the first medium A1 to the first and second turbine 44a, 48a in series, the total amount of work extracted therefrom can be maximized while limiting the pressure ratios required at each turbine 44a, 48a. Similarly, by providing the first medium A1 to the first and second turbine 44a, 48a in parallel, the temperature and pressure of the first medium used as a heat sink for the condenser 52 and the heat exchanger 60 may be controlled. Alternatively, in embodiments where valve V8 is open, the first medium A1 output from the heat exchanger 60 may be configured to bypass the first turbine 44a. In such embodiments, substantially all of the first medium A1 output from the heat exchanger 60 is provided directly to the second turbine 48a.

In an embodiment, the pressure ratio of one or more of the turbines of the first compressing device 40a is reduced relative to existing turbines. As used herein, the term "pressure ratio" is intended to describe the ratio of the pressure of the medium provided to an inlet of the turbine and the pressure of the medium provided at the outlet of the turbine. In an embodiment, such as embodiments of the system 20 including a plurality of turbines 44a, 70 arranged in series relative to a flow of one or more mediums, the pressure ratio of each of the turbines may be reduced compared to conventional turbines. By using a plurality of turbines having a reduced pressure ratio in series, the energy extracted from the medium within the turbines may be maximized.

Yet another configuration of the system 20 is illustrated in the non-limiting embodiment of FIG. 4. As shown, the system 20 is substantially similar to the configuration of the system illustrated and described with respect to FIG. 3; however, the first compressing device 40a includes two compressors 42a1 and 42a2, arranged in parallel relative to a flow of the second medium A2 provided via the inlet 24. In such embodiments, the first and second compressors 42a1, 42a2 may be substantially identical. By providing two compressors 42a1, 42a2 in parallel, the total volume of the second medium A2 to be compressed within each device is reduced.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
   a plurality of inlets for receiving a plurality of mediums including a first medium and a second medium;
   an outlet for delivering a conditioned flow of the second medium to one or more loads of the aircraft;
   a ram air circuit including a ram air shell having at least one ram air heat exchanger positioned therein;
   a compressing device arranged in fluid communication with the ram air circuit and the outlet, the compressing device including a first compressor, a second compressor, and at least one turbine operably coupled via a shaft, the first compressor and the second compressor being arranged in parallel with respect to a flow of the second medium and wherein the first medium output from the compressing device is used as a heat sink by another component within the environmental control system, wherein the first medium output from the another component is exhausted overboard.

2. The environmental control system of claim 1, further comprising a dehumidification system arranged in fluid communication with the ram air circuit, wherein the first medium output from the at least one turbine is used as a heat sink within the dehumidification system.

3. The environmental control system of claim 2, wherein a portion of the dehumidification system is arranged within the ram air shell.

4. The environmental control system of claim 1, further comprising another compressing device arranged in fluid communication with and downstream from the compressing device.

5. The environmental control system of claim 4, wherein the another compressing device includes another compressor, and an outlet of the first compressor and an outlet of the second compressor are fluidly connected to an inlet of the another compressor.

6. The environmental control system of claim 5, further comprising a heat exchanger arranged between the outlet of the first compressor, the outlet of the second compressor and the inlet of the another compressor, wherein the second medium is cooled within the heat exchanger.

7. The environmental control system of claim 5, wherein the plurality of mediums further includes a third medium, the second medium being cooled by the third medium within the heat exchanger.

8. The environmental control system of claim 7, wherein the second medium is fresh air and the third medium is cabin discharge air.

9. The environmental control system of claim 1, further comprising:
a dehumidification system arranged in fluid communication with the ram air circuit.

10. The environmental control system of claim 9, wherein a portion of the dehumidification system is arranged within the ram air circuit.

11. The environmental control system of claim 10, further comprising a divider arranged within the ram air shell to separate the ram air shell into a first region and a second region, the at least one ram air heat exchanger being arranged within the first region and the portion of the dehumidification system being arranged within the second region.

12. The environmental control system of claim 11, wherein the at least one ram air heat exchanger is a separate component from the portion of the dehumidification system arranged within the second region.

13. The environmental control system of claim 11, wherein the at least one ram air heat exchanger and the portion of the dehumidification system arranged within the second region are integrally formed.

14. The environmental control system of claim 10, wherein the portion of the dehumidification system within the ram air circuit is the another component.

15. An environmental control system of an aircraft comprising:
a plurality of inlets for receiving a plurality of mediums including a first medium and a second medium;
an outlet for delivering a conditioned flow of the second medium to one or more loads of the aircraft;
a ram air circuit including a ram air shell having at least one ram air heat exchanger positioned therein;
a dehumidification system arranged in fluid communication with the ram air circuit;
a divider arranged within the ram air shell to separate the ram air shell into a first region and a second region, the at least one ram air heat exchanger being arranged within the first region and a portion of the dehumidification system being arranged within the second region; and
a compressing device arranged in fluid communication with the ram air circuit and the outlet, the compressing device including a first compressor, a second compressor, and at least one turbine operably coupled via a shaft, the first compressor and the second compressor being arranged in parallel with respect to a flow of the second medium and wherein the first medium output from the compressing device is used as a heat sink by another component within the environmental control system.

16. An environmental control system of an aircraft comprising:
a plurality of inlets for receiving a plurality of mediums including a first medium and a second medium;
an outlet for delivering a conditioned flow of the second medium to one or more loads of the aircraft;
a ram air circuit including a ram air shell having at least one ram air heat exchanger positioned therein;
a compressing device arranged in fluid communication with the ram air circuit and the outlet, the compressing device including a first compressor, a second compressor, a first turbine and a second turbine operably coupled via a shaft, the first compressor and the second compressor being arranged in parallel with respect to a flow of the second medium, the first turbine and the second turbine being arranged in series in a first mode and being arranged in parallel in a second mode relative to a flow of the first medium, wherein the first medium output from the compressing device is used as a heat sink by another component within the environmental control system.

* * * * *